US 8,541,514 B2

(12) United States Patent
Ferritto et al.

(10) Patent No.: US 8,541,514 B2
(45) Date of Patent: Sep. 24, 2013

(54) BRANCHED POLYGLYCOLS AND BRANCHED POLYETHER FUNCTIONAL ORGANOPOLYSILOXANES AND COATINGS CONTAINING SAME

(76) Inventors: Michael Salvatore Ferritto, Midland, MI (US); Frances Marie Fournier, Birch Run, MI (US); Michael Allen Stanga, Midland, MI (US); Gerald Lawrence Witucki, Midland, MI (US); Pierre T. Varineau, Lake Jackson, TX (US); Robert H. Whitmarsh, Lake Jackson, TX (US)

( * ) Notice: Subject to any disclaimer, the term of this patent is extended or adjusted under 35 U.S.C. 154(b) by 469 days.

(21) Appl. No.: 12/158,352

(22) PCT Filed: Dec. 22, 2006

(86) PCT No.: PCT/US2006/048859
§ 371 (c)(1),
(2), (4) Date: Nov. 20, 2009

(87) PCT Pub. No.: WO2007/075927
PCT Pub. Date: Jul. 5, 2007

(65) Prior Publication Data
US 2010/0234518 A1    Sep. 16, 2010

Related U.S. Application Data

(66) Substitute for application No. 60/845,154, filed on Sep. 15, 2006.

(60) Provisional application No. 60/753,323, filed on Dec. 22, 2005.

(51) Int. Cl.
*C08F 283/12* (2006.01)
*C08G 77/46* (2006.01)

(52) U.S. Cl.
USPC ........................................ 525/474; 528/417

(58) Field of Classification Search
USPC ........................................ 525/474; 528/417
See application file for complete search history.

(56) References Cited

U.S. PATENT DOCUMENTS

| | | | |
|---|---|---|---|
| 4,431,789 A * | 2/1984 | Okazaki et al. | 528/15 |
| 5,260,402 A * | 11/1993 | Weitemeyer et al. | 528/29 |
| 6,150,311 A * | 11/2000 | Decoster et al. | 510/122 |
| 6,297,331 B1 | 10/2001 | Feldmann et al. | |
| 6,417,323 B1 * | 7/2002 | Miyanaga et al. | 528/425 |
| 7,084,215 B2 * | 8/2006 | Dietz et al. | 525/474 |
| 7,176,264 B2 * | 2/2007 | Pettersson et al. | 525/410 |
| 7,655,744 B2 * | 2/2010 | Miyanaga | 528/27 |
| 2004/0097663 A1 * | 5/2004 | Deforth et al. | 525/474 |
| 2005/0261457 A1 | 11/2005 | Falk et al. | |

FOREIGN PATENT DOCUMENTS

| | | | |
|---|---|---|---|
| JP | 09278892 A | * | 10/1997 |
| JP | 09302087 A | * | 11/1997 |
| WO | 02092660 A | | 11/2002 |
| WO | WO 03080712 A1 | * | 10/2003 |
| WO | WO 2004026468 A1 | * | 4/2004 |

OTHER PUBLICATIONS

Machine Translation of JP 09302087 A.*
International Search Report and Written Opinion of the EPO as ISA as it relates to PCT/US2006/048859 mailed May 9, 2007.
Abstract; Database WPI Week 200434; Derwent Publications Ltd., London, GB; AN 2004-359128; XP002430200 & JP 2004 043609 A (TOA Gosei Chem Ind Ltd) Feb. 12, 2004.
Chinese Office Action dated Nov. 26, 2010, pertaining to Appln. No. 200680053157.4.

* cited by examiner

*Primary Examiner* — Mike M Dollinger

(57) ABSTRACT

Branched polyglycols and branched polyether functional organopolysiloxanes are disclosed as is a process for making branched polyether functional organopolysiloxanes by reacting an organohydrogensiloxane and a branched polyglycol having an unsaturated group via a hydrosilylation reaction, as well as coating compositions containing branched polyether functional organopolysiloxanes and a binder are disclosed. Coatings resulting from these compositions were more hydrophilic and had improved dirt release properties as compared to coatings containing similar, but un-branched, polyether functional organopolysiloxanes.

4 Claims, No Drawings

BRANCHED POLYGLYCOLS AND BRANCHED POLYETHER FUNCTIONAL ORGANOPOLYSILOXANES AND COATINGS CONTAINING SAME

CROSS REFERENCE TO RELATED APPLICATIONS

This application is a continuation of PCT Application Serial No. PCT/US2006/048859 filed Dec. 22, 2006, designating the United States and published in English, which claims the benefit of the filing date under 35 U.S.C. § 119(e) of U.S. Provisional Application No. 60/845,154 filed Sep. 15, 2006 and U.S. Provisional Application No. 60/753,323 filed Dec. 22, 2005, the entire contents of each of which are hereby incorporated herein by reference.

The present invention relates to branched polyglycols, to branched polyether functional organopolysiloxanes and a process for making them, and to coating compositions containing branched polyether functional organopolysiloxanes and a binder. Coatings resulting from these compositions were more hydrophilic and had improved dirt release properties as compared to coatings containing similar, but un-branched, polyether functional organopolysiloxanes.

There is a long standing need to identify coating or paint compositions that provide improved properties. In particular, there is a need to improve the dirt resistance of coatings. To this end, components and additives are sought in coating compositions that will improve the hydrophilicity of the resulting coated surfaces, and hence improved dirt resistance.

Allyl polyglycols used as precursors to produce silicone polyether surfactants are typically derived from ethylene oxide, propylene oxide, butylene oxide, and mixtures thereof. As such, they primarily have a linear copolymer structure with limited branching and subsequent hydroxyl groups in the molecule. For silicone polyether surfactants based on linear allyl alkoxylates, there is a molecular weight limit of approximately 550 Daltons to produce clear, room-temperature stable silicone polyethers. Additionally, there is a limit on polar density of linear poly(ethoxylate) groups, because of limited sites for hydroxyl-groups.

The present inventors have discovered that certain branched polyglycols can be used to produce improved branched polyether functional organopolysiloxanes, which in turn can be used to produce improved coating compositions. The branched polyether group contains multiple polyoxy-alkylene units in a non-linear structure. In addition, the branched polyether groups may contain additional hydroxyl groups. The inclusion of such branched sites in the polyether provides enhanced chemical and physical properties (such as reduced pour point or lowered freezing temperature) in many applications vs conventional linear structured silicone polyethers.

Branched polyethers are known, and are often based on glycidol or hydroxy-containing oxetane with the following structures:

Glycidol:

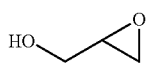

Alkyl, hydroxy-containing Oxetane:

R1 is a $C_1$-$C_4$ alkyl group or a hydroxyl-containing $C_1$-$C_4$ alkyl group,
R2 is a hydroxyl-containing $C_1$-$C_4$ alkyl group.

Acid or base catalyzed oligomerization of these compounds with active hydrogen containing initiators such as alcohols result in branched polyethers.

EP 116,978 teaches alkylene oxides co-polymerized with glycidol to produce branched polyethers. These were not subsequently converted to silicone surfactants. WO 2004/026468 describes allyl-alcohol initiated copolymers made from alkylene oxides and glycidol ethers as polymerizable emulsifiers.

In an embodiment of the present invention there is provided branched polyether functional organopolysiloxanes comprising at least one siloxy unit of the formula $R_iR^1SiO_{[3-i]/2}$ wherein
R is a monovalent hydrocarbon group,
$R^1$ is a branched polyether group,
i is zero to 2.

The present invention further provides a process for preparing a branched polyether functional organopolysiloxane comprising reacting;
A) an organohydrogensiloxane, and
B) a branched polyether having an unsaturated group, via a hydrosilylation reaction.

The present invention also provides a coating composition comprising:
a) a branched polyether functional organopolysiloxane comprising at least one siloxy unit of the formula $R_iR^1SiO_{[3-i]/2}$
wherein i is zero to 2
R is a monovalent hydrocarbon group,
$R^1$ is a branched polyether group, and
b) a binder.

The present invention further relates to the coatings prepared from these compositions. The resulting coatings are more hydrophilic, as compared to similar coatings prepared using un-branched silicone polyethers, and also have improved dirt resistance.

This invention further relates to branched polyglycols useful for making branched polyether-functional organopolysiloxanes. The branched polyglycols have a random or block copolymer structure.

Organopolysiloxanes are well known and are often designated as comprising any number of monosiloxy units ($R_3SiO_{0.5}$), disiloxy units ($R_2SiO$), trisiloxy units ($RSiO_{1.5}$), or quaternary siloxy units ($SiO_2$) where R is independently any monovalent organic or hydrocarbon group. When R is methyl in the siloxy unit formulas of an organopolysiloxane, the respective siloxy units are often designated as M, D, T or Q siloxy units. The organopolysiloxane of the present invention may contain any number or combination of monosiloxy units ($R_3SiO_{0.5}$), disiloxy units ($R_2SiO$), trisiloxy units ($RSiO_{1.5}$), or quaternary siloxy units ($SiO_2$) units, but has at least one substituent that is a branched polyether group. In other words, at least one of the R groups in the organopolysiloxanes of the present invention must be a branched polyether. Thus the organopolysiloxanes contain at least one siloxy unit of the formula $R_iR^1 SiO_{[3-i]/2}$ wherein R is a monovalent hydrocarbon group,
R$^1$ is a branched polyether group,
i is zero to 2.

The structures of branched polyglycols can be complex. For example, a branched polyglycol generated from an allyl-alcohol initiated glycidol/alkylene oxide random co-feed may have the following structure;

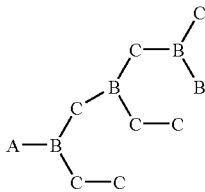

where,
A is CH2=CH—CH2-O—,
B is a branching agent derived from glycidol or a mono-hydroxyl oxetane,
C is an alkylene oxide having a structure —(CH2-CR—O)—, where each R is independently selected from the group —($C_qH_{2q+1}$), where q is 0 to 5.

A branched polyglycol generated from an allyl alcohol initiated block glycidol/alkylene oxide co-feed may have the following structure:

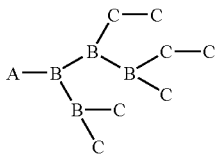

where,
A is CH2=CH—CH2-O—,
B is a branching agent derived from glycidol or a mono-hydroxyl oxetane,
C is an alkylene oxide having a structure —(CH2-CR—O)—, where each R is independently selected from the group —($C_qH_{2q+1}$), where q is 0 to 5.

Branched polyglycols resulting from alkyl oxetanes may be more complex. For di-hydroxyl-containing oxetanes (for example 3,3-bis(hydroxymethyl)oxetane), there are three branch points per molecule of branching agent. For mono-hydroxy-containing oxetanes, (for example 3-ethyl-3-(hydroxymethyl)oxetane), there are two branch points per branching agent.

An example a possible structure of a branched polyglycol produced by a block polymerization of 3,3-bis(hydroxymethyl)oxetane onto allyl alcohol, followed by a block of alkylene oxide is shown below:

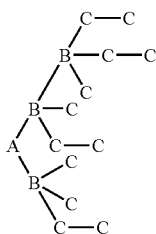

A is CH2=CH—CH2-O—,
B is a branching agent derived from a di-hydroxyl containing oxetane group,
C is an alkylene oxide having a structure —(CH2-CR—O)—, where each R is independently selected from the group —($C_qH_{2q+1}$), where q is 0 to 5.

To facilitate the structural representation of branched polyglycols, we use the following simplified notation:

A-[(B)n(C)x(D)y(E)z], where,
A is CH2=CH—CH2-O—,
B is a branching agent derived from glycidol or mono- or di-hydroxyl containing oxetane groups, with n from 1 to 20,
C, D, and E are each an alkylene oxide having a structure —(CH2-CR—O)—, where each R is independently selected from the group —($C_qH_{2q+1}$), where q is 0 to 5, and x, y, and z are independently from 0 to 50. The polymer structure can be either random or block.

Representative, non-limiting, examples of the branched polyether functional organopolysiloxane of the present invention include:

($R_2R^1SiO_{0.5}$)($SiO_2$)$_w$($R_2R^1SiO_{0.5}$)

($R_2R^1SiO_{0.5}$)($SiO_2$)$_w$($R_2SiO$)$_x$($R_2R^1SiO_{0.5}$)

($R_2R^1SiO_{0.5}$)($R_2SiO$)$_x$($R_2R^1SiO_{0.5}$)

($R_3SiO_{0.5}$)($R_2SiO$)$_x$($R^1RSiO$)$_y$($R_3SiO_{0.5}$)

($R_3SiO_{0.5}$)($R_2SiO$)$_x$($R^1RSiO$)$_y$($RSiO_{1.5}$)$_z$($R_3SiO_{0.5}$)
and ($R_3SiO_{0.5}$)($R_2SiO$)$_x$($R^1RSiO$)$_y$($SiO_2$)$_w$($R_3SiO_{0.5}$), where R is a monovalent hydrocarbon, and R$^1$ is as defined above,
w≧0, x≧0, y≧2, and z is ≧0.

The organopolysiloxanes having a branched polyether group may be obtained by the processes of the present invention. Thus, the present invention further provides a method for preparing a branched polyether functional organopolysiloxane, the method involves;
reacting;
A) an organohydrogensiloxane, and
B) a branched polyglycol having an unsaturated group, via a hydrosilylation reaction.

A) The Organohydrogensiloxane

Component A) of the present invention is an organohydrogensiloxane. As used herein, organohydrogensiloxane is any organopolysiloxane containing at least one silicon-bonded hydrogen atom (SiH) per molecule. Organohydrogensiloxanes have at least one SiH present on a M, D, or T siloxy unit, and can be represented as comprising of "M$^H$" siloxy units ($R_2HSiO_{0.5}$), "D$^H$" siloxy units (RHSiO), "T$^H$" siloxy units ($HSiO_{1.5}$). Thus, the organohydrogensiloxanes useful in the present invention may comprise any number of M, M$^H$, D, D$^H$, T, T$^H$, or Q siloxy units, providing at least one siloxy unit contains SiH.

Representative, non-limiting, examples of organohydrogensiloxanes suitable as component A) in the present invention include:

($R_2HSiO_{0.5}$)($SiO_2$)$_w$($R_2HSiO_{0.5}$)

($R_2HSiO_{0.5}$)($SiO_2$)$_w$($R_2SiO$)$_x$($R_2HSiO_{0.5}$)

($R_2HSiO_{0.5}$)($R_2SiO$)$_x$($R_2HSiO_{0.5}$)

($R_3SiO_{0.5}$)($R_2SiO$)$_x$(RHSiO)$_y$($R_3SiO_{0.5}$)

$$(R_3SiO_{0.5})(R_2SiO)_x(HRSiO)_y(RSiO_{1.5})_z(R_3SiO_{0.5})$$

and $$(R_3SiO_{0.5})(R_2SiO)_x(RHSiO)_y(SiO_2)_w(R_3SiO_{0.5}),$$

where R is a monovalent hydrocarbon, and $w \geq 0$, $x \geq 0$, $y \geq 1$, and z is $\geq 0$.

B) The Branched Polyglycol Having an Aliphatic Unsaturated Group

Component B) in the present invention is a branched polyglycol as defined above having an aliphatic unsaturated group, that is any organic molecule containing both a branched polyglycol and an aliphatic unsaturated group. Component B) may be represented by the following formula:

A-[(B)n(C)x(D)y(E)z], where,

A is CH2=CH—CH2-O—,

B is a branching agent derived from glycidol or mono- or di-hydroxyl containing oxetane groups, with n from 1 to 20, C, D, and E are each an alkylene oxide having a structure —(CH2-CR—O)—, where each R is independently selected from the group —($C_qH_{2q+1}$), where q is 0 to 5, and x, y, and z are independently from 0 to 50. The polymer structure can be either random or block.

Representative, non-limiting examples of unsaturated branched polyethers useful as component B) in the present invention include:

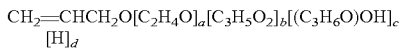
$CH_2$=$CHCH_2O[C_2H_4O]_a[C_3H_5O_2]_b[(C_3H_6O)OH]_c[H]_d$

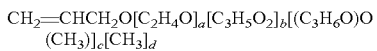
$CH_2$=$CHCH_2O[C_2H_4O]_a[C_3H_5O_2]_b[(C_3H_6O)O(CH_3)]_c[CH_3]_d$

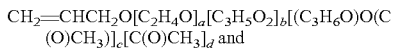
$CH_2$=$CHCH_2O[C_2H_4O]_a[C_3H_5O_2]_b[(C_3H_6O)O(C(O)CH_3)]_c[C(O)CH_3]_d$ and

$CH_2$=$C(CH_3)O[C_2H_4O]_a[C_3H_5O_2]_b[(C_3H_6O)OH]_c[H]_d$, where $a \geq 1$, $b \geq 0$, $c \geq 0$, $d \geq 1$ and with the provisios that $[b+c] \geq 1$ and $d \leq [2b+c]$ in the above formulae.

The unsaturated branched polyethers may be prepared by any techniques known in the art, but are typically prepared by base catalyzed polymerization of alkylene oxides, in particular ethylene oxide, and glycidol ($C_3H_6O_2$) with an unsaturated alcohol initiator such as allyl alcohol. The amounts and ratio of alklene oxide and glycidol used in the preparation of the branched polyether control the molecular weight and amount of branched sites:

—CH($CH_2OR^3$)$CH_2O$—,

—$CH_2CH(OH)CH_2O$—, or

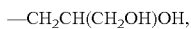
—$CH_2CH(CH_2OH)OH$, present in the branched polyether.

Typically, the branched polyether will have residual OH groups after neutralization. Alternatively, the hydroxy groups can be further reacted to form pendant ether groups, such as —$OCH_3$ if methanol/sodium methoxide is used; or alternatively, may be acetoxy terminated if the terminal hydroxy groups are reacted with acetic anhydride.

C) The Hydrosilylation Reaction

Components A) and B) are reacted via a hydrosilylation reaction. Hydrosilylations are known in the art and require the addition of an appropriate catalyst. Suitable hydrosilylation catalysts for use in the present invention are known in the art and many are commercially available. Most commonly, the hydrosilylation catalyst is a platinum group metal and is added in an amount of 0.1 to 1000 ppm based on the weight of the reactants A) and B), alternatively 10 to 100 ppm of the platinum group metal. The hydrosilylation catalyst may comprise a platinum group metal selected from platinum, rhodium, ruthenium, palladium, osmium or iridium metal or organometallic compound thereof, or a combination thereof. The hydrosilylation catalyst is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix.

Suitable hydrosilylation catalysts are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

The hydrosilyation reaction can be conducted neat or in the presence of a solvent. The solvent can be an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha.

The amount of solvent can be up to 50 weight percent, but is typically from 20 to 50 weight percent, said weight percent being based on the total weight of components in the hydrosilylation reaction. The solvent used during the hydrosilylation reaction can be subsequently removed from the resulting reaction product mixture by various known methods.

The amount of components A) and B) used in the hydrosilylation reaction can vary, and typically the amounts used are expressed as the molar ratio of the unsaturated group in component B) vs the SiH content of component A). Typically, the hydrosilylation reaction is conducted with a slight molar excess of the unsaturated group vs SiH to ensure complete consumption of the SiH in the hydrosilylation reaction. Typically, the hydrosilylation reaction is conducted with a 20%, alternatively 10%, alternatively 5%, or alternatively 1% molar excess of the unsaturated group vs the molar SiH content of the polyorganohydrogensiloxane.

Coating or paint compositions typically contain a binder, pigment, filler, solvent or diluent, and other additives. Binders are considered an essential component in coating compositions since it eventually solidifies to form a dried film. The coating compositions of the present invention contain at least one binder and the branched polyether functional organopolysiloxanes as described above. Suitable binders may be selected from any known in the art as such components in a coating composition. Typically, binders may be either synthetic or natural resins, such as acrylics, polyurethanes, polyesters, melamines, epoxies, or oils.

In one embodiment of the present invention, the binder is selected from an acrylic emulsion having a solids content ranging from 10 to 95 weight percent. As used herein, an acrylic emulsion is a two-phase system in which acrylic polymer droplets are dispersed in an external water phase. Acrylic polymers are comprised chiefly of esters of acrylic and methacrylic acid that are polymerized by addition polymerization, usually using a free radical mechanism. The acrylic emulsion polymers may contain varying proportions of acrylic or methacrylic monomers used alone, or in combination with other monomers, to effect resulting physical properties of the coating. Other monomers may be included with the acrylic or methacrylic monomers such as styrene, acrylonitrile, and methacrylamide.

Representative, non-limiting examples of acrylic emulsions that may be used as the binder component in the present compositions include;

Rhoplex™ SG-30 (Rohm & Haas, Philadelphia, Pa.)
Rhoplex™ Multilube 200 (Rohm & Haas, Philadelphia, Pa.)
Rhoplex™ AC-261 (Rohm & Haas, Philadelphia, Pa.)
Rovace™ 9100 (Rohm & Haas, Philadelphia, Pa.)
Joncryl™ 537 (SC Johnson, Racine, Wis.)
Joncryl™ 530 (SC Johnson, Racine, Wis.)

The coating compositions of the present invention are prepared by combining and mixing the branched polyether functional organopolysiloxane and the binder. Conventional mixing techniques are typically sufficient to produce the compositions.

The amounts of the branched polyether functional organopolysiloxane and binder present in the coating compositions of the present invention may vary, but typically ranges from 0.01 to 20 parts by weight of the organopolysiloxane,
  alternatively from 0.1 to 10 parts by weight of the organopolysiloxane,
    alternatively from 0.5 to 5 parts by weight of the organopolysiloxane per 100 parts of the solids content of the binder.

The coating compositions can further comprise other ingredients, additives or auxiliaries, such as other polymers or polymer dispersions, pigments, dyes, emulsifiers (surfactants), pigment dispersion aids, leveling agents, anti-cratering agents, antifoaming agents, anti-sagging agents, heat stabilizers, UV absorbers, antioxidants, and fillers.

Coating compositions containing branched polyether functional organopolysiloxanes and a binder may be used to improve the dirt release properties of coated surfaces. They may also be used to render such coatings more hydrophilic.

The coating composition of the present invention may be applied to any substrate. The substrate may be, for example, metal, plastic, wood, glass or another coating layer. The other coating layer may be comprised of the coating composition of the current invention or it may be a different coating composition.

The coating compositions may be used in a variety of architectural coating formulations such as; interior wall coatings (flat and sheen), gloss & semi-gloss paints for interior and exterior use, paints for facades, elastomeric wall coatings, multipurpose primers, wood stains for interior and exterior, exterior wood coatings.

The coating compositions may also be used in a variety of industrial coating formulations, such as automotive paints, and paints for various metal surfaces.

These following examples are intended to illustrate the invention to one of ordinary skill in the art and are should not be interpreted as limiting the scope of the invention set forth in the claims.

EXAMPLE 1

Branched Polyglycol MW 550:

Allyl alcohol was purified by charging 2500 mL allyl alcohol with 1 g of sodium hydroxide (NaOH 85%) into a 5 L 3-neck round bottom flask. Approximately 2000 mL of this allyl alcohol was distilled at 99° C. into a separate 2 L 3-neck round bottom flask using a short-path distillation column. A mixture comprising approximately 400 grams of this purified allyl alcohol plus 5 grams of potassium hydroxide flake (KOH 85%) was then charged into a 2-L 3-neck round bottom flask, and azeotropically distilled using a 2-10 plate column to remove approximately 80 grams of an enriched allyl alcohol water mixture. The remaining allyl alcohol/potassium allylate solution contained less than 0.1% of water by weight.

Approximately 311 grams of the allyl alcohol/potassium allylate solution was charged into a 9-L stainless steel autoclave and heated to 120° C. Approximately 398 grams of glycidol was slowly fed to the autoclave at 120° C. Heating at 120° C. was continued for three hours after the addition of glycidol to allow for complete reaction. The material was then ethoxylated with 2255 grams of ethylene oxide (EO) at 120° C. Heating at 120° C. was continued for three hours after the addition of EO to allow for complete reaction. After cooling to 70° C., the ethoxylate blend was mixed with approximately 50 grams of magnesium silicate, stirred for 5-90 minutes, and then filtered using an appropriate filter aid (diatomaceous earth). The final product had a viscosity of 60.9 cSt at 100° F., and a pH of 7.0.

EXAMPLE 2

Branched Polyglycol MW 850: A procedure similar to example 1 was used, with the following amounts of reagents: 203 grams of purified, dried allyl alcohol/potassium allylate (catalyzed with 5 grams of potassium hydroxide prior to azeotropic distillation), 259 grams of glycidol, and 2513 grams ethylene oxide. The final product had a viscosity of 87 cSt at 100° F., and a pH of 7.0.

EXAMPLE 3

The pour point (also referred to as the freeze point) of the branched polyglycol in Example 2 was compared with a linear allyl-alcohol ethoxylate with a molecular weight of approximately 850 prepared using standard ethoxylation procedures. The pour point of the branched polyglycol in Example 2 was −2° C. whereas the pour point of a standard linear allyl ethoxylate with a molecular weight of approximately 850 was approximately 34° C. This example illustrates that the incorporation of a single point of branching into the backbone of an allyl alcohol ethoxylate with a molecular weight of approximately 850 decreases the pour point by 36° C.

EXAMPLE 4

Rake Type Spe

Materials
Branched Polyglycols

The branched polyglycols used in examples 4-8 were prepared by the base catalyzed polymerization of ethylene oxide and glycidol with an allyl alcohol initiator using techniques commonly known for the preparation of allyl initiated polyglycols. The amounts of ethylene oxide and glycidol used controlled the molecular weight and OH content of the resulting polyglycols. The OH or hydroxy content is reported per allyl group in each example along with the overall molecular weight of the polyglycol polymer.

Methyl Hydrogen Containing Siloxanes

Methyl hydrogen containing siloxanes were prepared by known techniques. The siloxanes used herein are labeled using M, D, and D' to represent the $(Me_3SiO_{0.5})$, $(Me_2SiO)$, and $(MeHSiO)$ siloxy units respectively.

A mixture composed of 9.69 g (13.0 mmoles of siloxane polymer, 75.1 mmoles of SiH) of a methyl hydrogen containing siloxane of formula $MD_{3.2}D'_{5.8}M$, 90.31 g (106 mmoles) of a branched polyether (M.W.=850 and an average of 6 hydroxyls per allyl end), 33.3 g of 2-propanol and 0.16 g (2.0 mmoles) of sodium acetate was placed in a 250 ml three neck round bottom flask. The mixture was heated to 75° C. and once at temperature, 52.0 microliters of Pt IV catalyst was added (5 ppm Pt). The reaction reached a maximum temperature of 91.6° C. Heating at 75° C. was continued for an additional 90 minutes. The 2-propanol was removed under reduced pressure to yield 97.4 g of a yellow oil that had 10.7 ppm of residual SiH.

EXAMPLE 5

ABA Type SPE

A mixture composed of 117.0 g (32.7 mmoles of siloxane polymer, 63.3 mmoles of SiH) of a methyl hydrogen containing siloxane of formula $M'D_{48}M'$, 133.0 g (88.7 mmoles) of a branched polyether (M.W.=1,500 and an average of 6 hydroxyls per allyl end), 83.3 g of 2-propanol and 0.4 g (4.9 mmoles) of sodium acetate was placed in a 500 ml three neck round bottom flask. The mixture was heated to 75° C. and once at temperature, 124.0 microliters of Pt IV catalyst was added (10 ppm Pt). The reaction reached a maximum temperature of 83.4° C. Heating at 75° C. was continued for an additional 90 minutes. The 2-propanol was removed under reduced pressure to yield 237.1 g of a brownish viscous material that had 11.3 ppm of residual SiH.

EXAMPLE 6

Resin Based SPE

A mixture composed of 39.4.0 g (175 mmoles of SiH) of a methyl hydrogen containing siloxane resin of formula $M^H{}_{0.38}T^{Me}{}_{0.30}T^{Ph}{}_{0.30}$, 210.6 g (227.9 mmoles) of a branched polyether (M.W.=850 and an average of 6 hydroxyls per allyl end), and 83.3 g of toluene was placed in a 500 ml three neck round bottom flask. The mixture was heated to 75° C. and once at temperature, 124.0 microliters of Pt IV catalyst was added (10 ppm Pt). Heating at 75° C. was continued for an additional 90 minutes. The toluene was removed under reduced pressure to yield 225.3 g of a light yellow oil that had 9.7 ppm of residual SiH.

EXAMPLE 7

Rake SPE

A mixture composed of 56.1 g (252 mmoles of siloxane polymer, 252 mmoles of SiH) of a methyl hydrogen containing siloxane of formula $MD'_{10}M$, 194 g (353 mmoles) of a branched polyether (M.W.=550 and an average of 2 hydroxyls per allyl end), 83.3 g of toluene was placed in a 500 ml three neck round bottom flask. The mixture was heated to 75° C. and once at temperature, 124.0 microliters of Pt IV catalyst was added (10 ppm Pt).

The reaction reached a maximum temperature of 98.1° C. Heating at 75° C. was continued for an additional 90 minutes.

The toluene was removed under reduced pressure to yield 241.1 g of a light yellow oil that had 7.8 ppm of residual SiH.

EXAMPLE 8

Rake SPE

A mixture composed of 46.8 g (24.5 mmoles of siloxane polymer, 58.9 mmoles of SiH) of a methyl hydrogen containing siloxane of formula $MD_{22}D'_2M$, 78.3 g (65.3 mmoles) of a branched polyether (M.W.=1,200 and an average of 6 hydroxyls per allyl end), 42.0 g of 2-propanol and 0.20 g (2.4 mmoles) of sodium acetate was placed in a 250 ml three neck round bottom flask. The mixture was heated to 75° C. and once at temperature, 65.0 microliters of Pt IV catalyst was added (5 ppm Pt). The reaction reached a maximum temperature of 93.1° C. Heating at 75° C. was continued for an additional 90 minutes. The 2-propanol was removed under reduced pressure to yield 118.5 g of a yellow oil that had 8.5 ppm of residual SiH.

EXAMPLE 9

Coating Compositions

The following polyether functional organopolysiloxanes were evaluated in a coating composition.
SPE A=$M^{PE}D_{13}M^{PE}$ comparative example an ABA type silicone polyether (no branching)
where $M^{PE}$ is a mono siloxy unit having a polyether substituent of the formula

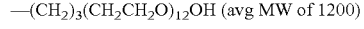
—$(CH_2)_3(CH_2CH_2O)_{12}OH$ (avg MW of 1200)

SPE B=$M^{BPE}D_{13}M^{BPE}$ an ABA type silicone polyether
where $M^{BPE}$ is a monosiloxy unit having a branched polyether substituent with an average Mw of 1200, and 6 OH units per molecule.
SPE C=$MD_{22}D^{PE}{}_2M$ comparative example a "rake" silicone polyether (no branching)
where $D^{PE}$ is a disiloxy unit having a polyether substituent of the formula

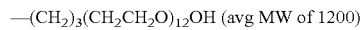
—$(CH_2)_3(CH_2CH_2O)_{12}OH$ (avg MW of 1200)

SPE D=$MD_{22}D^{BPE}{}_2M$ a "rake" silicone polyether
where $D^{BPE}$ is a monosiloxy unit having a branched polyether substituent with an average Mw of 1200, and 6 OH units per molecule.
SPE Resin A=$M^{BPE}{}_{.741}D^{Me}{}_{.011}T^{Me}{}_{.248}$ a silicone resin
where $M^{BPE}$ is a monosiloxy unit having a branched polyether substituent with an average Mw of 1200, and 6 OH units per molecule.
Carbinol Resin A=$M^{PrOH}{}_{0.283}T^{Me}{}_{0.686}$ (comparative example) a silicone resin
where $M^{PrOH}$ is a monosiloxy unit having a carbinol functional group of the formula:

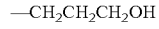
—$CH_2CH_2CH_2OH$

In a 4 oz. bottle 20 g of SG 30 (an acrylic binder available from Rohm & Haas) were blended with 0.1 g of either a branched or unbranched (for comparison) silicone polyether (adjusted if non-volatile content was not 100%). These were mixed on a rotational mixer at a low speed for 10 minutes, then allowed to sit for an additional 15 minutes before coating. The resulting compositions were then applied onto 3" by 6" uncoated aluminum panels (obtained from Q-Panels Inc) using a 6 mil draw down bar. The resulting coatings were tested for hardness, water contact angle, dirt release performance, and were placed into an outdoor panel rack for 1008+/−15 hours for external weathering.

Dirt Release was measured visually using the following procedure. The samples were coated with a thin surface of dirt so the whole panel was covered. The panels were then placed at a 90 degree angle and slightly tapped to remove any excess dirt. The samples were then placed in a holder at a 45 degree angle and water pipetted across them in 5 different streams. The samples were evaluated as to how much soil was released from the surface as a comparison to the neat (no additive) binder performance. This soil release procedure was repeated again after the panels were allowed to sit outside for 1008 hours during the March/April/May time frame. The results are summarized in Table 1 for the various samples.

TABLE 1

| Example type | Sample | Water Contact Angle | Dirt Release* Evaluation | Dirt Release* after 1008 hour |
|---|---|---|---|---|
| Control | Neat SG 30 | 44 | 0 | −2 |
| Control | SG 30 w/branched polyether (no silicone) | 35 | 1 | −1 |
| Comparative example | SG 30 w/SPE A (un-branched) | 27 | 2 | 0 |
| Working example | SG 30 w/SPE B branched | <15 | 4 | 2 |
| Comparative example | SG 30 w/SPE C (un-branched) | 25 | 2 | 0 |
| Working example | SG 30 w/SPE D branched | <15 | 4 | 2 |
| Working example | SG 30 w/SPE Resin A | 15 | 4 | 3 |
| Comparative example | SG 30 w/Carbinol Resin A | 25.15 | 3 | 1 |

*Dirt Release up is defined as either enhanced (positive designation) as compared to the base control (neat SG 30 binder) formulation at 0 or lowered (negative notation) as compared to the control

The invention claimed is:

1. A non-fluorinated branched polyether functional organopolysiloxane comprising a combination of quarternary siloxy units and at least one siloxy unit of the formula $R_iR^1SiO_{[3-i]/2}$
wherein
R is a monovalent hydrocarbon group,
$R^1$ is a branched polyether group, having the formula $A-[(B)_n(C)_x(D)_y(E)_z]$, where:
A is $CH_2=CH-CH_2-O-$ attached to the polysiloxane via a hydrosilylation reaction,
B is a branching agent derived from glycidol with n from 1 to 20,
C, D, and E are each an ethylene oxide group and x, y, and z are independently from 0 to 50 with the proviso that at least one of x, y or z is 1 to 50, and
i is zero to 2;
wherein the polymer structure of the branched polyether functional organopolysiloxane is either random or block wherein the organopolysiloxane has the average formula:

$(R_2R^1SiO_{0.5})(SiO_2)_w(R_2R^1SiO_{0.5})$, $(R_2R^1SiO_{0.5})(SiO_2)_w(R_2SiO)_x(R_2R^1SiO_{0.5})$, $(R_3SiO_{0.5})(R_2SiO)_x(R^1RSiO)_y(SiO_2)_w(R_3SiO_{0.5})$, where R is a monovalent hydrocarbon,
$R^1$ is a branched polyether group, and
w>0, X≧0 and y≧1.

2. A process for preparing a branched polyether functional organopolysiloxane comprising reacting;
i) an organohydrogenpolysiloxane comprising a combination of quarternary siloxy groups and at least one mono-, di-, or tri-siloxy group containing Si—H, and
ii) a branched polyglycol having an unsaturated group, via a hydrosilylation reaction;
wherein the branched polyglycol having an unsaturated group has the formula:

$A-[(B)_n(C)_x(D)_y(E)_z]$, where,
A is $CH_2=CH-CH_2-O-$,
B is a branching agent derived from glycidol with n from 1 to 20,
C, D, and E are each an ethylene oxide group, and x, y, and z are independently from 0 to 50 with the proviso that at least one of x, y or z is 1 to 50,
wherein the polymer structure is either random or block wherein the organopolysiloxane has the average formula:

$(R_2HSiO_{0.5})(SiO_2)_w(R_2HSiO_{0.5})$, $(R_2HSiO_{0.5})(SiO_2)_w(R_2SiO)_x(R_2HSiO_{0.5})$, $(R_3SiO_{0.5})(R_2SiO)_x(RHSiO)_y(SiO_2)_w(R_3SiO_{0.5})$, where R is a monovalent hydrocarbon, and
w>0, x≧0, and y≧1.

3. A product prepared by the process of claim 2.

4. A coating composition comprising:
a) a non-fluorinated branched polyether functional organopolysiloxane comprising a combination of quarternary siloxy units and at least one siloxy unit of the formula $R_iR^1SiO_{[3-i]/2}$
wherein i is zero to 2
R is a monovalent hydrocarbon group,
$R^1$ is a branched polyether group, having the formula:

$A-[(B)_n(C)_x(D)_y(E)_z]$, where,
A is $CH_2=CH-CH_2-O-$ attached to the polysiloxane via a hydrosilylation reaction,
B is a branching agent derived from glycidol with n from 1 to 20, and
C, D, and E are each an ethylene oxide group, and x, y, and z are independently from 0 to 50 with the proviso that at least one of x, y or z is 1 to 50;
wherein the polymer structure is either random or block; and
b) a binder wherein the organopolysiloxane has the average formula:

$(R^2R^1SiO_{0.5})(SiO_2)_w(R_2R^1SiO_{0.5})$, $(R_2R^1SiO_{0.5})(SiO_2)_w(R_2SiO)_x(R_2R^1SiO_{0.5})$, $(R_3SiO_{0.5})(R_2SiO)_x(R^1RSiO)_y(SiO_2)_w(R_3SiO_{0.5})$, where R is a monovalent hydrocarbon,
$R^1$ is a branched polyether group, and
w>0, x≧0, and y≧1.

* * * * *

UNITED STATES PATENT AND TRADEMARK OFFICE
CERTIFICATE OF CORRECTION

PATENT NO. : 8,541,514 B2  Page 1 of 1
APPLICATION NO. : 12/158352
DATED : September 24, 2013
INVENTOR(S) : Ferritto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Fifteenth Day of September, 2015

Michelle K. Lee
*Director of the United States Patent and Trademark Office*